Oct. 30, 1956     R. C. MOORE     2,769,159
CAPACITIVE COMMUTATORS
Filed Oct. 26, 1954

INVENTOR
ROY C. MOORE
By Elmer J. Gorn
ATTORNEY

United States Patent Office 2,769,159
Patented Oct. 30, 1956

2,769,159

CAPACITIVE COMMUTATORS

Roy C. Moore, Lexington, Mass., assignor to Raytheon Manufacturing Company, Waltham, Mass., a corporation of Delaware Application October 26, 1954, Serial No. 464,850

16 Claims. (Cl. 340—3)

This invention relates to capacitive commutators and more particularly to such commutators of signals in the form of slowly varying unidirectional voltages.

In such applications as sonar, a signal to be commutated is available in the form of a slowly varying unidirectional voltage. Such a voltage is developed by rectifying the output of an amplifier coupled to the output of a transducer or other signal source. The amplified and detected signal of each source is applied to a sector-shaped conductive plate applied to one of a group of sector-shaped conductive plates arranged in a plane about the arc of a circle concentric with a shaft that carries a conductive plate formed in the same shape as that of the signal receiving plates but larger by the spacing between these plates. This rotary plate is coupled to the input of a fullwave rectifying circuit. The signal appearing at this input at any given time is the signal appearing from the direction represented by the transducer or transducers whose detected output is connected to the stator plate or plates over which the rotor plate is positioned at that instant. In such a system interpolation between transducer positions becomes a problem. It is desirable to obtain an indication of the bearing of the target when this target is intermediate between the bearings of adjacent transducers. In the system of the invention this is accomplished by imposing the signal from adjacent transducers upon the associated plates as unidirectional voltages of opposite polarity. As the rotor sweeps past these plates, a charge is developed between the rotor and the adjacent stator plate or plates. This charge varies as a sine function when equal signals are applied to adjacent stators. The changes in this charge develop at the input to the rectifier a voltage that varies with time as the differential of a sine function. When this signal is rectified in the fullwave rectifier circuit, the resulting voltage appears to have a maximum at a time when the rotor is half way between the stators and two maxima, one on either side of the first at half the amplitude of the first. When the signal is coming from a direction closer to that represented by one of the two adjacent stators, the central maxima will occur at a time when the rotor is closest to the stator receiving the strongest signal. Under the same conditions but with charges of the same polarity on adjacent stators, the signal is the same from the time that the rotor is directly over one stator plate to the time it is directly over the second stator plate when both stator plates receive equal signal and changes only gradually when the signal source is closer to one than the other. Thus with the system of the invention it is possible to indicate the direction of a signal received from a bearing between that of two adjacent transducers.

While it is to be understood that the invention may be used with other systems, its use in a sonar system will be described by way of example.

Other and further advantages of this invention will be apparent as the description thereof progresses, reference being had to the accompanying drawing wherein.

Figure 1:
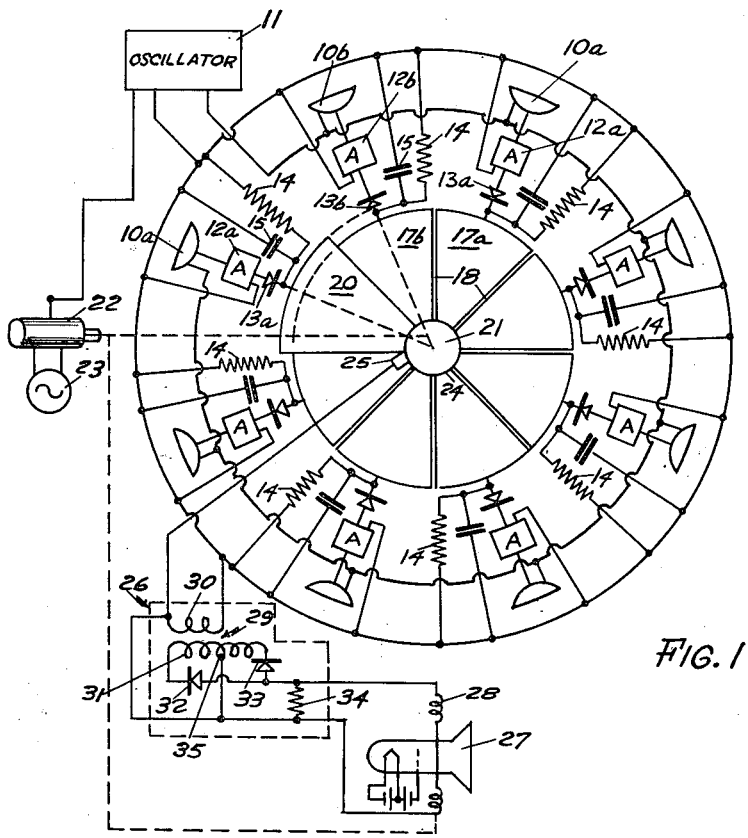
Fig. 1 is a schematic diagram of a sonar system utilizing the commutator of the invention.

In Fig. 1 the reference numerals 10 designate transducers such as are used in echo ranging by compressional wave energy in a fluid medium. Each of said transducers is connected to a generator 11 of electrical energy at an appropriate frequency to produce the outgoing pulse of energy. The output of alternate transducers 10a is amplified in amplifiers 12a and rectified by rectifiers 13a to produce a positive slowly varying D. C. voltage across a time delay circuit, each comprising a resistor 14 and a capacitor 15. This voltage is proportional to the compressional wave energy received by its associated transducer 10a in one scanning interval. The outputs of each of the remaining transducers 10b are amplified in an amplifier 12b and rectified by rectifiers 13b to produce a negative slowly varying D. C. voltage across the time delay circuit comprising resistors 14 and capacitors 15, again in voltages proportional to the compressional wave energy received by its associated transducer 10b in one scanning interval.

The commutator comprises a plurality of stator plates 17a and 17b of some conductive material separated by spaces 18 that preferably may be filled with strips of insulating material. Stator plates 17a are coupled to the outputs of amplifiers 12a and the stator plates 17b are coupled to the outputs of amplifiers 12b. This places potentials of opposing polarity on the adjacent stator plates 17a and 17b. A rotor plate 20 made of a conductive material in a shape similar to that of the stator plate 17 but wider by the width of the spacing 18 is mounted for rotation with a shaft 21 driven by a synchronous motor 22 from a source of potential 23. The rotor 20 is connected electrically through a slip ring 24, a brush 25 and a fullwave rectifier circuit 26 to an indicator that may be most conveniently a cathode ray tube 27 arranged to give a PPI display. In this case the rectified signal would be applied to the radial deflection coils 28 which are also rotated by the motor 22. The motion of the motor is synchronized in any of the well-known ways with the transmission of the outgoing pulse of energy so that the pulse goes out at regular intervals related to the time that it takes the rotor to pass directly over all of the stator plates. The resulting display represents both the distance and direction of detected objects. Without the transmitter the system can indicate the direction from which a signal is received. The fullwave rectifier 26 comprises a transformer 29 having a primary 30 to which is connected the brush 25 and a secondary 31, each end of which is connected to a rectifier 32 or 33. These rectifiers are connected to the radial deflection coils 28 of the indicator across an impedance 34 that is returned to a center tap 35 on the secondary 31 of the transformer 29. Of course other circuits which will give a fullwave rectification instead of the circuit shown can be used. Also other types of cathode ray representation may be used for the indicator and types of indicators other than those using cathode ray tubes may be used.

Figure 2:
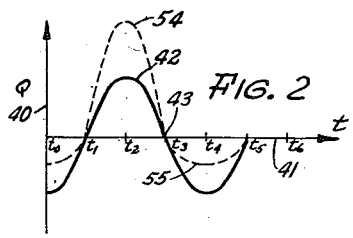
Fig. 2 is a graph of the variation of the charge between the rotor and adjacent stator plates with respect to time.
Figure 4:
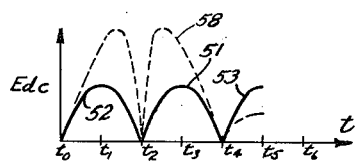
Fig. 4 is a graph of this voltage after rectification in a fullwave rectifier.
Figure 3:
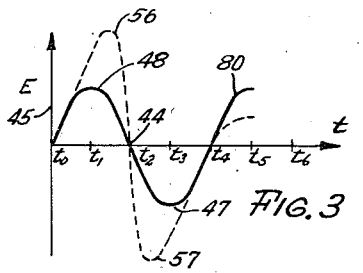
Fig. 3 is a graph of the variation of the resulting voltage across the input to the rectifier with time.

The operation of the circuit can best be understood by reference to the graphs of Figs. 2, 3, and 4. When the rotor plate 20 is directly above a stator plate 17a the signal voltage appearing across the capacitor 15 causes a charge, Q, to be built up in the capacitor formed by the stator plate 17 and the rotor plate 20. This charge increases to a maximum when the rotor is directly over the stator and decreases as the rotor passes off the stator 17a and on to the adjoining stator plate 17b. This is shown in Fig. 1 where the charge, Q, is plotted vertically along the line 40 and time, t, is plotted horizontally along the line 41. The variation of Q with time is given by the solid line 42 assuming an equal signal applied to all the stator plates. At a time $t_0$ the rotor plate 20 is assumed to be directly centered over a stator plate 17b having a negative signal applied to it producing a maximum negative charge. As the rotor passes over to the adjacent stator plate 17a having a positive charge due to the positive polarity of the signal applied to it, the negative charge between the plates decreases as a positive charge is placed on the capacitor by the positive signal voltage appearing across the capacitor 15 associated with the stator plate 17a which partially cancels the negative charge from the plate 17b. When the rotor plate 20 is equally over both stator plates 17a and 17b at a time $t_1$ the two voltages cancel each other and no charge is developed between the plates, as shown by the graph 42, passing through 0 at the point 43. As the rotor plate 20 passes on over a second stator plate 17a, the positive charge caused by the voltage across the capacitor 15 associated with the stator plate 17a causes an increasingly positive charge to develop between the plates, as shown by the positive direction of the graph 42 in this region, until it reaches a maximum at a time $t_2$. As the rotor plate 20 passes on over the adjacent stator plate 17b which receives negative potential from its associated capacitor 15, the curve becomes decreasingly positive passing through zero at a time $t_3$ and finally being negative again at a time $t_4$. The solid curve 42 gives the case where the signal potentials on the stator plates 17a and 17b are equal. As the charge varies it develops a voltage, E, in the input to the rectifier circuit 26 that is approximately the differential of the charge across the plates with respect to time, $dQ/dt$. This differential is represented by the curve 44 of Fig. 3 in which the voltage E, is plotted vertically along the line 45 and the time, t, is plotted horizontally along the line 46. It will be seen that the curve 44 has a negative maximum 47 and positive maxima 48 and 50, one on either side of the maximum 47, and both, having the amplitude of the maximum 47. When the voltage shown in Fig. 3 is rectified in the rectifier circuit 26, it appears approximately as shown in Fig. 4 with a central maximum 51 corresponding to the negative maximum 47 of Fig. 3 and with two equal positive maxima 52 and 53 corresponding to the positive maxima 48 and 50 of Fig. 3. Thus it can be seen that a signal appearing equally at several adjoining transducers 10a and 10b will appear as a series of equal pulses symmetrically disposed between positions on the indicator face corresponding to the bearings of the transducers. The charge produced by a signal from a source whose bearing is closer to that of transducer 10a is shown by the dotted graphs in Figs. 2, 3, and 4. It will be seen that the positive maximum charge 54 is considerably larger than the maximum negative charge 55. The presence of these unequal charges results in a voltage being developed at an input to the rectifier 26 and represented by the graph 56 that reaches a negative maximum 57 at a time earlier than the maximum 47. When rectified this gives a maximum 58 which causes a maximum deflection along a direction corresponding to the true bearing of the target within a small degree of error.

While the invention has been described as used in a sonar equipment, the stator plates may be fed with a unidirectional voltage that is proportional to the information received which is within the relatively narrow response range of one of a series of devices having a selective response to a complex signal but together covering the entire range of the expected signal, thus permitting the complex signal to be analyzed. For instance, each signal source might be a transducer and associated network each responsive to a narrow band of audio frequencies and capable of converting a complex sound wave into electrical vibrations at a narrow band of frequencies.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In combination a commutator comprising a plurality of conductive plates and means for moving one of said plates relative to the others, means for applying separate signals to adjacent stationary plates in phase opposition, and means to rectify both polarities of the voltage appearing across the capacitor formed by the moving plate and at least one stationary plate to produce a voltage proportional to the signal applied to the stationary plates adjacent the moving plate at that instant.

2. In combination a commutator comprising a plurality of conductive plates formed as the sector of a circle mounted about the arc of a circle in a common plane and means for moving one of said plates relative to the others, means for applying separate signals to adjacent stationary plates in phase opposition, and means to rectify both polarities of the voltage appearing across the capacitor formed by the moving plate and at least one stationary plate to produce a voltage proportional to the signal applied to the stationary plates adjacent the moving plate at that instant.

3. In combination a commutator comprising a plurality of conductive plates and synchronous electric motor means for moving one of said plates relative to the others, means for applying separate signals to adjacent stationary plates in phase opposition, and means to rectify both polarities of the voltage apearing across the capacitor formed by the moving plate and at least one stationary plate to produce a voltage proportional to the signal applied to the stationary plates adjacent the moving plate at that instant.

4. In combination a commutator comprising a plurality of conductive plates and means for moving one of said plates relative to the others, means comprising a circuit having a time constant approximately equal to the time required for the moving plate to pass all the stationary plates for applying separate signals to adjacent stationary plates in phase opposition, and means to rectify both polarities of the voltage appearing across the capacitor formed by the moving plate and at least one stationary plate to produce a voltage proportional to the signal applied to the stationary plates adjacent the moving plate at that instant.

5. In combination a commutator comprising a plurality of conductive plates formed as a sector of a circle mounted about the arc of a circle in a common plane and synchronous electric motor means for moving one of said plates relative to the others, means for applying separate signals to adjacent stationary plates in phase opposition, and means to rectify both polarities of the voltage appearing across the capacitor joined by the moving plate and at least one of the stationary plates to produce a voltage proportional to the signal applied to the stationary plates adjacent the moving plate at that instant.

6. In combination a commutator comprising a plurality of conductive plates formed as a sector of a circle mounted about the arc of a circle in a common plane and means for moving one of said plates relative to the others, means comprising a circuit having a time constant approximately equal to the time required for the moving plate to pass all the stationary plates for applying separate signals to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

7. In combination a commutator comprising a plurality of conductive plates and synchronous electric motor means for moving one of said plates relative to the others, means comprising a circuit having a time constant approximately equal to the time required for the moving plate to pass all the stationary plates for applying separate signals to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

8. In combination a commutator comprising a plurality of conductive plates formed as a sector of a circle mounted about the arc of a circle in a common plane and synchronous electric motor means for moving one of said plates relative to the others, means comprising a circuit having a time constant approximately equal to the time required for the moving plate to pass all the stationary plates for applying separate signals to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

9. A compressional wave echo ranging system comprising a plurality of transducers adapted to translate compressional wave energy into electrical energy, a plurality of conductive plates, means for moving one of said plates relative to the others, means for applying a signal from each transducer to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

10. A compressional wave echo ranging system comprising a plurality of transducers adapted to translate compressional wave energy into electrical energy, a plurality of conductive plates formed as the sector of a circle and all but one mounted about an arc of a circle in a common plane, means for moving this plate relative to the others, means for applying a signal from each transducer to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

11. A compressional wave echo ranging system comprising a plurality of transducers adapted to translate compressional wave energy into electrical energy, a plurality of conductive plates, synchronous motor means for moving one of said plates relative to the others, means for applying a signal from each transducer to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

12. A compressional wave echo ranging system comprising a plurality of transducers adapted to translate compressional wave energy into electrical energy, a plurality of conductive plates, means for moving one of said plates relative to the others, means comprising a circuit having a time constant approximately equal to the time required for the moving plate to pass over all the stationary plates for applying a signal from each transducer to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

13. A compressional wave echo ranging system comprising a plurality of transducers adapted to translate compressional wave energy into electrical energy, a plurality of conductive plates formed as a sector of a circle and all but one mounted about an arc of a circle in a common plane, synchronous motor means for moving this plate relative to the others, means for applying a signal from each transducer to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

14. A compressional wave echo ranging system comprising a plurality of transducers adapted to translate compressional wave energy into electrical energy, a plurality of conductive plates formed as a sector of a circle and all but one mounted about an arc of a circle in a common plane, means for moving this plate relative to the others, means comprising a circuit having a time constant approximately equal to the time required for the moving plate to pass over all the stationary plates for applying a signal from each transducer to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plates at that instant.

15. A compressional wave echo ranging system comprising a plurality of transducers adapted to translate compressional wave energy into electrical energy, a plurality of conductive plates, synchronous motor means for moving one of said plates relative to the others, means comprising a circuit having a time constant approximately equal to the time required for the moving plate to pass over all the stationary plates for applying a signal from each transducer to adjacent stationary plates in phase opposition, and means to rectify both polarities of the voltage appearing across the capacitor formed by the moving plate and at least one of the stationary plates to produce a voltage proportional to the signal applied to the stationary plates adjacent the moving plate at that instant.

16. A compressional wave echo ranging system comprising a plurality of transducers adapted to translate compressional wave energy into electrical energy, a plurality of conductive plates formed as a sector of a circle and all but one mounted about an arc of a circle in a common plane, synchronous motor means for moving one of said plates relative to the others, means comprising a circuit having a time constant approximately equal to the time required for the moving plate to pass over all the stationary plates for applying a signal from each transducer to adjacent stationary plates in phase opposition, and means to rectify both polarities of the voltage appearing across the capacitor formed by the moving plate and one or more stationary plates to produce a voltage proportional to the signal applied to the stationary plates adjacent the moving plate at that instant.

References Cited in the file of this patent

UNITED STATES PATENTS 2,678,435     Vaughan _____ May 11, 1954

OTHER REFERENCES

Montani: "Capacity Commutator Eliminates Fractional Contacts," Tele-Tech & Electronic Industries, March 1954, pages 76, 77 and 181–187.